Figure 1:
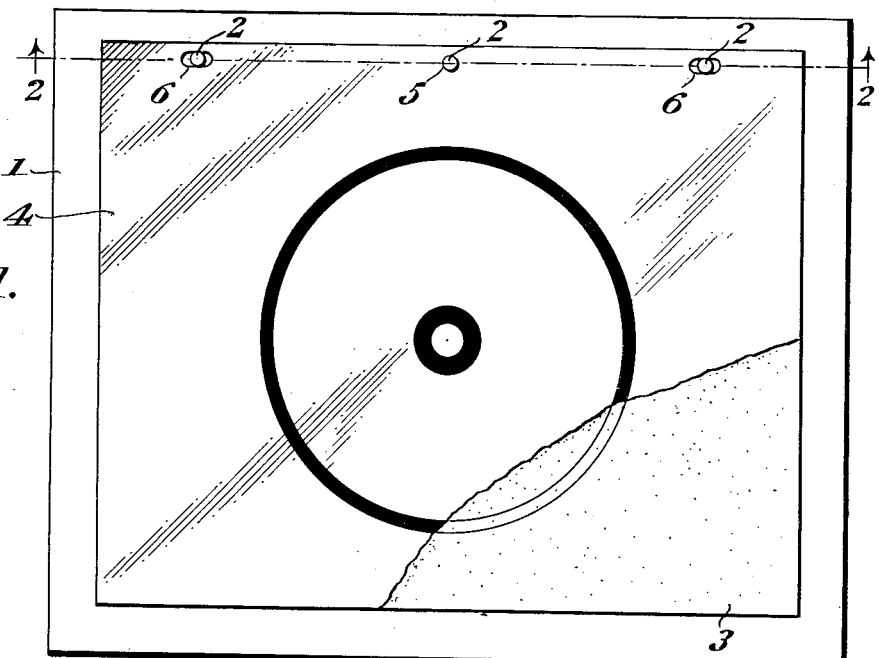

May 28, 1929. F. L. GOLDMAN 1,715,127
MEANS FOR PRODUCING ANIMATED PICTURES
Filed Feb. 23, 1927

INVENTOR
Frank L. Goldman
BY
ATTORNEYS.

Patented May 28, 1929.

1,715,127

UNITED STATES PATENT OFFICE.

FRANK LYLE GOLDMAN, OF MOUNT VERNON, NEW YORK, ASSIGNOR TO CARPENTER-GOLDMAN LABORATORIES, INC., OF LONG ISLAND CITY, NEW YORK, A CORPORATION OF NEW YORK.

MEANS FOR PRODUCING ANIMATED PICTURES.

Application filed February 23, 1927. Serial No. 170,216.

The main object of the present invention is to effect an improvement in the production of that class of motion pictures known as "animated pictures." In the production of a projection film for such pictures, a series of pictures representing an object in different positions is photographed in proper sequence whereby when the film is projected the object will appear to move on the screen. Great difficulty has been experienced in rendering the movement of the object smooth and natural. The object usually progresses in a jerky manner and the various parts of the projected picture become repeatedly displaced and disjointed and cause objectionable vibration upon the screen. Much of this displacement is caused by imperfect registration of the different pictures.

In order to avoid an enormous amount of labor in the production of a series of these pictures they are usually planned so that the major portion thereof such as the background, or the body of a figure, will occupy the same relative picture areas throughout a great length of film, and only an object or parts thereof will appear in motion. To accomplish this a base picture of the non-moving parts only is made upon a single sheet. A sheet containing a picture of the moving part only is then placed over the base picture and both pictures are photographed. The picture of the moving part is next removed and another picture of said part in an advanced position is placed over the base picture and both are again photographed. A large number of pictures of the moving part are in this manner photographed in succession upon the base sheet to produce the illusion of motion upon the viewing screen. In order to obtain the best results it is important that the different pictures of the moving part should properly register with the base picture when photographed and also that each picture should be properly positioned with relation to the pictures preceding and following it in the series. Otherwise the objectionable displacement and vibration referred to will occur. It is also important that the different pictures of the moving parts be originally executed in proper relation to each other and to the picture upon the base sheet. This is accomplished by superposing the sheets of picture material in succession upon the base picture sheet and executing each picture with proper relation to the others. A good registration of the sheets is obviously important in this operation also.

Heretofore it has been extremely difficult and often impossible to obtain a proper registration of the picture sheets even with the utmost care. This failure is due to the expansion and contraction of the sheets caused by changing temperatures and other varying atmospheric conditions. Frequently the sheets are formed of different materials having different coefficients of expansion thus adding greatly to the difficulty. The displacement caused by this unequal expansion and contraction of the sheets becomes very obvious and pronounced in the greatly enlarged projection of the pictures upon the viewing screen.

The present invention provides means whereby a good registration of the picture sheets is obtained and the objectionable effects of expansion and contraction are practically eliminated.

Figure 2:
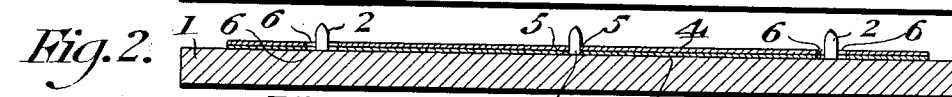
Figure 3:
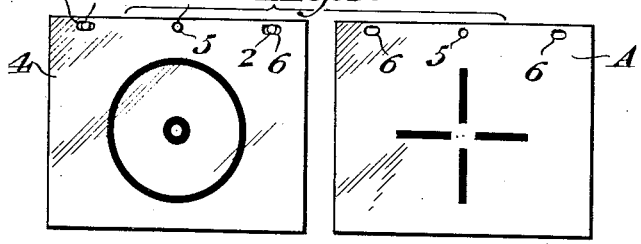
Figure 4:
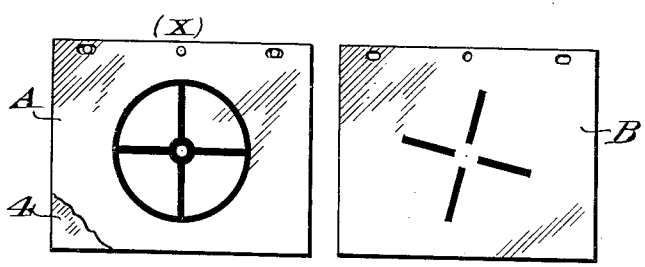
Figure 4:
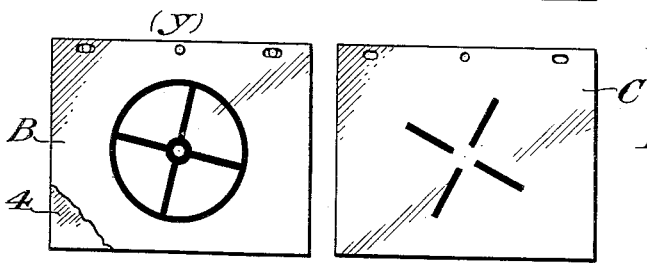
Figure 4:
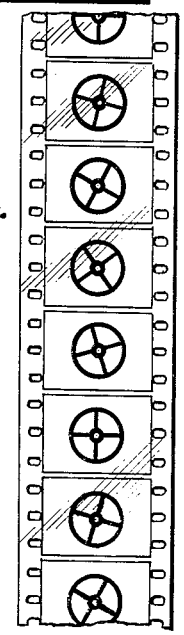

In the drawings:

Fig. 1 is a plan view of a support and two picture sheets embodying my invention;

Fig. 2 a section taken on the line 2—2 of Fig. 1;

Fig. 3 a group view illustrating certain steps in the production of an animated picture film; and Fig. 4 a view of a section of said film.

Referring by numerals to the various parts, 1 designates a flat support for one or more picture sheets. Extending from the flat face of the support are three upstanding projections or pegs 2 equally spaced apart along a straight line. The pegs are rigidly carried by the support, are cylindrical in form for a material portion of their length upwardly from the flat face of the support, have the same diameter and their upper ends are tapered.

In Fig. 1 two picture sheets 3 and 4 are shown mounted upon the support in superposed relation. The under sheet 3 is a sheet of paper containing an original picture. The top sheet 4 is a tracing sheet of transparent material, preferably transparent celluloid, although other suitable material may be used. The sheets are of the same form and size being rectangular and measuring approximately eight-and-one-half by eleven inches. This size may, however, be varied to suit different requirements. At its upper marginal edge each sheet is formed with three apertures or cut-outs arranged upon a straight line parallel to the upper edge of the sheet and spaced and formed to receive the pegs 2. These apertures are spaced a slight distance inwardly from the upper edge of the sheet and the middle aperture 5 is located midway the length of said edge. The outer apertures 6 are equally spaced from the aperture 5 and are located respectively adjacent the opposite side edges of the sheet. The intermediate aperture 5 is round and of a size to snugly fit its peg 2. The outer or end apertures 6 are equally elongated in the direction of a straight line connecting them to provide clearance at opposite sides of their pegs 2 along said lines; the width of each corresponds to the diameter of the pegs and to that of the middle aperture and their ends are rounded.

A series of pictures representing a rotating wheel has been chosen for a simple illustration of the method of producing an animated picture. Referirng to Fig. 1, sheet 3 contains a drawing of the rim and hub of the wheel, which comprise the non-moving parts of the picture, the rotation of the wheel being expressed by the apparent movement of the spokes of the wheel only. The picture upon sheet 3 is traced upon the transparent sheet 4. A series of drawings or pictures are next made of the spokes only of the wheel, each successive drawing showing the spokes advanced further in the direction of apparent rotation and each drawing being made with proper reference to the picture of the rim and hub upon the sheet 3 or upon the sheet 4 as a base sheet and the pegs and apertures cooperating to hold the drawing in proper register with said base sheet. Tracings are then made of this series of drawings. In Fig. 3 "A", "B" and "C" show three tracings of the series upon a reduced scale. The first tracing sheet 4, containing the wheel rim and hub, serves as a base sheet for the photographing of the series. This sheet is placed upon a flat support which may be the support 1 or another similar flat support provided with pegs of the same character to enter the apertures of the sheet. The first tracing "A" of the wheel spokes is placed upon the sheet 4 in registration with it, the pegs 2 entering the apertures of the sheet "A" also. The sheet "A" being of transparent material the wheel rim and hub are visible through it and appear in proper relation to the spokes. The two tracings combined thus form a complete wheel as shown at (x). The superposed tracings are then photographed, after which, the sheet "A" is removed and the sheet "B" is placed upon the base sheet 4, as shown at (y) and photographed with it. All of the tracings in the series are placed upon the base sheet in proper sequence and photographed one by one upon a negative film. The pegs and apertures cooperate to accurately register the tracing or superposed picture and the base sheet without the necessity of any particular care on the part of the photographer. Fig. 4 shows a portion of a positive film containing the wheel pictures arranged in proper sequence to give the illusion of motion when the film is projected.

The design and arrangement of the apertures in each picture sheet and the manner in which the pegs engage the apertures causes the sheet to be firmly held against bodily displacement in any direction upon the support but still permits the sheet to freely expand or contract with a minimum displacement of the picture or parts thereof. The snug engagement of the central peg in the aperture 5 prevents the sheet from shifting bodily toward either side upon the support. The horizontal parallel edges of the elongated outer slots 6 closely engage opposite sides of their pegs and firmly hold the sheet against any turning movement about the central peg as a pivot. The elongation of the slots provides clearance at opposite sides of the pegs 2 along a straight line through the row of apertures and parallel to the horizontal edges of the sheet. The aperture 5 is located midway between the apertures 6 and upon the vertical center line of the sheet. The sheet is thus firmly held at the center by the central peg against bodily displacement toward either side edge. It is, however, free to expand outwardly in opposite directions from the central peg and to contract inwardly toward said peg owing to the lateral clearance provided by the elongated outer slots 6.

It is extremely desirable to prevent or reduce to a minimum any picture displacement at the center of the picture area. This is the point upon the screen toward which the eye of the observer is directed and most of the action is planned to occur here. Any displacements occurring at this point are therefore most conspicuous and objectionable, frequently causing the movements of the animated object to appear jerky and the moving parts of an object to become disjointed from the non-moving parts. In the case of the rotating wheel, for example, the spokes would ordinarily be subjected to relative displacement from the hub and rim. Extremely slight displacements of the picture sheets due to expansion or contraction are enormously magnified upon the viewing screen. The effects of this expansion and contraction of the sheets has proved a serious obstacle to the production of good animated pictures. The present invention controls or distributes the expansion and contraction of the sheets in a manner to practically eliminate its objectionable effects. It will be seen that each sheet is so held that its medial portion is prevented from shifting laterally. The expansion or contraction must, therefore, initiate at the center of the sheet and proceed outwardly toward the sides of the sheet. The maximum displacement, therefore, occurs at the outer, free margins of the sheet where it will do the least harm, while the displacement at the center of the sheet where the action takes place is reduced to a minimum.

While I have described and shown what I consider a practical embodiment of my invention, it will be understood that changes may be made therein without departing from the scope of the invention, as defined in the claims.

What I claim is:

1. A picture sheet formed in one of its marginal edges with three apertures arranged in a row and spaced apart a material distance; a flat support for the sheet; and three projections mounted in a fixed relation to the support and spaced apart corresponding to the spacing of the said apertures, the central aperture being formed to snugly receive the central projection to prevent displacement of the sheet upon the support along the direction of the aperture row and the end apertures being formed to receive the end projections, engage two opposite sides thereof to prevent the sheet from turning upon the central projection and formed to provide clearance for the end projections along the direction of a straight line connecting them, whereby the sheet may expand and contract from said central projection.

2. A sheet of material for the purpose set forth formed with a small cut-out located intermediate two opposite edges of the sheet and two small outer cut-outs spaced at opposite sides of said intermediate cut-out toward said sheet edges respectively; a flat support for the said sheet; and three projections supported in fixed relation to the sheet support and formed and disposed to enter the sheet cut-outs, the intermediate cut-out and its respective projection being formed to prevent bodily displacement of the sheet toward either of said edges, and the outer cut-outs and their respective projections being formed to prevent the sheet from turning upon the intermediate projection and to provide clearance to permit the expansion and contraction of the sheet from said intermediate projection outwardly and inwardly past the outer projections.

3. A sheet of material for the purpose set forth; a flat support for said sheet; means to positively hold the sheet at a point intermediate two of its opposite edges against bodily displacement upon the support toward either of said edges; and means to hold the sheet at a point spaced outwardly from said intermediate point toward one of said edges of the sheet and prevent the sheet from turning upon the support about the intermediate point as a pivot, said outer holding means being adapted to permit the sheet to contract and expand toward and from its positively held intermediate point past said outer holding point, whereby expansion and contraction displacements of the sheet will be minimized at the medial portion of the sheet.

4. In an animated picture producing equipment, a base sheet containing a picture of a non-moving part of the animated picture; a series of sheets for successive superposition upon the base sheet containing pictures of a moving part of the animated picture represented in different positions upon the different sheets of the series; a flat support for the base sheet; and means to hold the base sheet upon the support against bodily displacement thereon in any direction in the plane of the sheet, hold one of said sheets upon the base sheet in constant register with it, and permit both sheets to expand and contract inwardly and outwardly in opposite directions from a medial portion of each sheet, whereby expansion and contraction displacements of the superposed sheets will be minimized at the medial portions of the sheets.

5. In an animated picture producing equipment, a base sheet containing a picture of a non-moving part of the animated picture and formed with a cut-out located at a medial portion of the sheet and a cut-out spaced outwardly at one side of said medial cut-out; a series of transparent sheets for successive superposition upon the base sheet containing pictures of a moving part of the animated picture represented in different positions upon different sheets of the series, each sheet of the series being formed with two cut-outs corresponding in form and spacing to the cut-outs of the base sheet; a flat support for the base sheet; two projections mounted in fixed relation to the support and adapted to enter the said cut-outs in the sheets, said cut-outs and projections being relatively formed and arranged to hold the base sheet upon the support against bodily displacement thereon in any direction in the plane of the sheet, hold one of said sheets of the series upon the base sheet in constant register with it, and permit both sheets to expand and contract inwardly and outwardly in opposite directions from a medial portion of each sheet, whereby expansion and contraction displacements of the superposed sheets will be minimized at the medial portions of the sheets.

6. In an animated picture producing queipment, a base sheet containing a picture of a non-moving part of the animated picture and formed with an aperture located at a medial portion of the sheet and two apertures spaced outwardly at opposite sides of said medial aperture; a series of transparent celluloid sheets for successive superposition upon the base sheet containing pictures of a moving part of the animated picture represented in different positions upon different sheets of the series, each sheet of the series being formed with three apertures corresponding in form and spacing to the apertures of the base sheet; a flat support for the base sheet; three projections mounted in fixed relation to the support and adapted to enter the apertures in the sheets, said apertures and projections being relatively formed and arranged to hold the base sheet upon the support against bodily displacement thereon in any direction in the plane of the sheet, hold one of said sheets of the series upon the base sheet in constant register with it, and permit both sheets to expand and contract inwardly and outwardly in opposite directions from a medial portion of each sheet, whereby expansion and contraction displacements of the superposed sheets will be minimized at the medial portions of the sheets.

7. A sheet of material to contain an executed object picture for photographing, formed adjacent one edge with three small apertures arranged in a straight line extending along said edge, the middle aperture being round and located midway the length of the edge, and the end apertures being elongated in the direction of said straight line and formed with straight longitudinal sides parallel to said line; a flat support for said sheet; and three round projections mounted in a fixed relation to the support and spaced apart corresponding to the spacing of said apertures, the central projection being formed to snugly fit in the central aperture and the end projections being formed to enter the end apertures and closely engage the said straight sides thereof for the purpose set forth.

In testimony whereof I hereunto affix my signature.

FRANK LYLE GOLDMAN.